Nov. 9, 1971 R. L. THORNTON ET AL 3,618,288

AUTOMATIC TRAY LOADING APPARATUS

Filed May 1, 1970 8 Sheets-Sheet 1

Ronald L. Thornton
David D. Leahy
INVENTORS

BY

Arnold, White & Durkee
ATTORNEYS

AUTOMATIC TRAY LOADING APPARATUS

Ronald L. Thornton
David D. Leahy
INVENTORS

BY
Arnold, White & Durkee
ATTORNEYS

Ronald L. Thornton
David D. Leahy
INVENTORS

BY

Arnold, White & Durkee
ATTORNEYS

AUTOMATIC TRAY LOADING APPARATUS

Ronald L. Thornton
David D. Leahy
INVENTORS

BY
Arnold, White & Durkee
ATTORNEYS

Ronald L. Thornton
David D. Leahy
INVENTORS

BY
Arnold, White & Durkee
ATTORNEYS

Ronald L. Thornton
David D. Leahy
INVENTORS

BY

Arnold, White & Durkee
ATTORNEYS

Ronald L. Thornton
David D. Leahy
INVENTORS

BY
Arnold, White & Durkee
ATTORNEYS g) SEQUENCE CONTINUES
AS IN a) THROUGH e) ABOVE Ronald L. Thornton
David D. Leahy
INVENTORS BY
Arnold, White & Durkee
ATTORNEYS

United States Patent Office 3,618,288
Patented Nov. 9, 1971

3,618,288

AUTOMATIC TRAY LOADING APPARATUS

Ronald L. Thornton, Portland, Oreg., and David D. Leahy, Corpus Christi, Tex., assignors to Clayton Specialties, Inc., Corpus Christi, Tex.

Filed May 1, 1970, Ser. No. 33,787
Int. Cl. B65b *57/06, 57/20*
U.S. Cl. 53—55 23 Claims

ABSTRACT OF THE DISCLOSURE

In one exemplar form, an automatic chain driven transfer apparatus for moving packaged bakery products temporarily arrested on a continuously moving power free roller conveyor transversely to the direction of conveyor movement to a loading tray spaced adjacent the transfer apparatus and parallel to the moving conveyor. A loading tray is automatically indexed to its proper position by the action of a controlled tray conveyor, the operation of which is controlled by the transfer apparatus control circuit.

BACKGROUND OF THE INVENTION

This invention relates to a novel and useful apparatus for transversely transferring various packaged products from a continuously moving conveyor to a prepositioned loading tray adjacent the conveyor.

In the baking industry it has long been a problem to load packaged loaves of bread and other packaged bakery products from a continuous conveyor into appropriate loading trays or baskets for transfer to a truck or transportation pallets. In the past, the loading of bread loaves and other packaged bakery products from the conveyor to loading trays has been generally accomplished by hand, a slow process and one that provides many opportunities for damage to the packaged bread loaves or other packaged bakery products. This is particularly true in a large bakery where thousands of loaves of bread and other products a day are being continuously packaged and routed via continuously moving conveyors to loading areas, and it is not hard to understand why it takes many men to manually transfer the bread loaves and other bakery products from the conveyors to loading trays or baskets for transfer to delivery trucks. Many man hours are wasted in simply loading trays and baskets, and when coupled with the damage problem, the cost of hand loading looms significantly indeed.

It is also common in the baking industry to use rather standard size loading trays or baskets and existing equipment for off-loading packaged products or transferring packaged products from a conveyor to another conveyor or merely transferring the products from a conveyor to a dead conveyor section would not solve the problem of handling the delicately packaged loaves of bread or bakery products and at the same time accommodate, load and move the standard-sized loading trays or baskets.

The present invention remedies the problems of the prior art by providing a means for automatic loading of a specific number of bread loaves or other bakery product packages from a continuous conveyor system into loading baskets or trays for further loading onto pallets or into trucks.

SUMMARY OF THE INVENTION

The instant invention provides a novel packaged product transfer means mounted above a continuously moving power free roller conveyor carrying the packaged products for transversely transferring a predetermined number of the packaged products, whose movement has been temporarily arrested on the conveyor, into a previously indexed or prepositioned loading tray adjacent the transfer apparatus and positioned on a tray conveyor parallel to the continuous packaged product conveyor.

The transfer means mounted above the continuously moving conveyor carrying the packaged products provides a first gate means for engaging one of the packaged products and arresting its movement on the conveyor and thereby arresting the movement of successive ones of the packaged products as they come into contact with the arrested first package. A second gate means is spaced ahead of the first gate means to engage another of the bakery products and arrest its movement on the continuous conveyor after a predetermined number of the packaged products has entered the space between the first and second gate means. The counting of the packaged products is accomplished by a photocell circuit reflecting a light beam from the wrapper of the packaged product.

Adjacent the continuously moving conveyor carrying the packaged products is an infeed tray conveyor for moving spaced empty loading trays into an index conveyor for properly indexing or prepositioning a loading tray into position for receiving the packaged products. The tray is positioned parallel to the packaged products conveyor and directly adjacent the space between the first and second gate means. The index conveyor has limit switches and stopping means cooperating with the index conveyor for engaging and maintaining a tray in the proper index position for loading. The infeed conveyor ahead of the index conveyor continues to transport a plurality of spaced loading trays so that as soon as the indexed or prepositioned loading tray has been loaded, it may be removed and another tray indexed into position by the index conveyor. A control circuit operates the infeed and index conveyors in conjunction with the transfer apparatus, including the first and second gate means. The transfer apparatus itself is mounted over the continuously moving packaged product conveyor and in the space between the first and second gate means and comprises a plurality of paddles mounted on a roller chain to transversely sweep across the conveyor and push the packaged products whose movement has been arrested between the first and second gate means into the loading tray directly adjacent the transfer apparatus.

Accordingly, the primary feature of the present invention is to provide a means for automatic loading of a predetermined number of packaged products from a continuously moving conveyor system into loading trays or baskets.

Another feature of the present invention is to provide controllable spaced gate means that may be operated to engage the packaged products moving on the continuous conveyor and temporarily arresting movement of the packaged products during the transfer cycle.

Yet another feature of the present invention is to provide an overhead mounted dual roller chain to which are attached a plurality of rectangular paddles for sweeping the temporarily arrested packaged products on the continuously moving conveyor transversely from the conveyor into an adjacent prepositioned loading tray.

Still another feature of the present invention is to provide tray conveyors for moving empty trays into a preselected indexed loading position opposite the transfer apparatus for receiving the packaged products as they are transversly swept from the continuously moving conveyor by the chain driven paddles.

Still another feature of the present invention is to provide means cooperating with the tray conveyor for properly indexing or prepositioning the loading tray and stopping its movement, and then moving the loading tray out of the indexed position after loading and repositioning and indexing another empty loading tray into the proper loading position.

Another feature of the present invention is to provide a control circuit for cooperatively operating the spaced gaiting means and the transfer apparatus in conjunction with the tray conveyor, the control circuit having the capability of opening the gating means and rejecting a transfer cycle if an empty loading tray has not been properly indexed into position.

BRIEF DESCRIPTION OF THE DRAWINGS

In order that the manner in which the above recited advantages and features of the invention are obtained, as well as others which will become apparent, can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope where the invention may admit to further equally effective embodiments.

In the drawings.

DETAILED DESCRIPTION OF THE PREFERRED EMBODIMENTS

Figure 1:
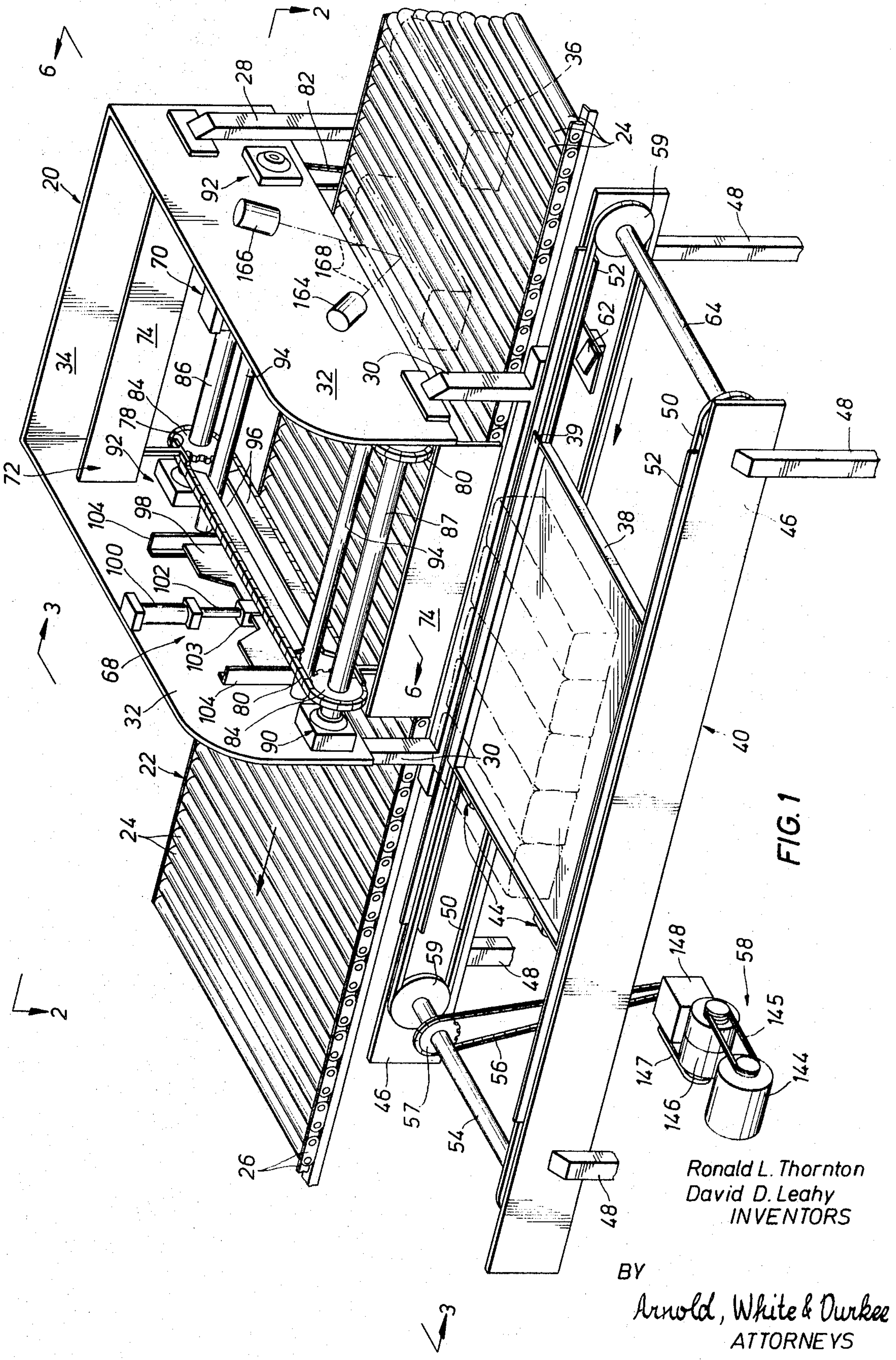
FIG. 1 is a perspective view of a packaged product conveyor transporting packages thereon and looking into the discharge end of the product transfer apparatus and the adjacent loading tray index conveyor with a loading tray in proper indexed position just after a product transfer has been made.

Referring now to FIGS. 1, 2, 3 and 6, the packaged product tray loading apparatus may be seen in greater detail. The packaged product transfer apparatus 20 is shown mounted above an off-feed conveyor 22 passing completely through the product transfer apparatus 20 in the direction shown by the arrow, and carrying packaged products 36, typically packaged loaves of bread. The packaged product conveyor 22 is a conventional power free roller conveyor having power free rollers 24, capable of free turning, linked in a continuous belt by links 26 and moving longitudinally to carry the packaged products. An infeed conveyor 21 is shown in dotted lines in FIG. 2 and feeds spaced bread loaves into the conveyor 22.

Apparatus 20 is mounted above conveyor 22 by means of structural frame members 28 and 30 attached to or comprising the conveyor and transfer means structural frame. However, the transfer means 20 could be mounted above an existing conveyor 22 merely by means of extending structural supports such as 28 and 30 as shown. A first loading tray 38 having extending tray flanges 39 on opposite ends of the tray is shown in its proper indexed position on the tray index conveyor 40. Tray index conveyor 40 is comprised of structural side members 46 mounted on legs 48, or the framing and support for conveyor 40 may be an extension of the frame and support for conveyor 22 and the transfer apparatus 20. Two spaced conveyor drive belts 50 engage the tray flange 39 and transport the tray from a second conveyor, the tray infeed conveyor 42, shown in dotted lines in FIG. 2. Infeed conveyor 42 is spaced immediately behind index conveyor 40 for carrying the loading trays and introducing them into index conveyor 40.

The pair of conveyor belt 50 move along an L-shaped conveyor belt support 52 for providing longitudinal support for the tray and belt, particularly after the tray has been loaded. The index conveyor 40 is driven by a motor drive assembly 58 that drives a chain 56 and rotates conveyor drive shaft 54 via sprocket 57 and conventional pulleys 59 carrying the belts 50. The conveyor belts 50 are supported on the opposite end of the index conveyor 40 by pulleys 59 and an idler shaft 64.

The drive motor assembly 58 is comprised of an electric motor 144 driving a clutch-brake device 146 by means of belt 145. The clutch-brake 146 is an electrically operated device having both clutch and brake coils for transferring the rotational power of motor 144 to drive chain 56 or braking the motor output for purposes to be hereinafter further explained. When clutch-brake 146 is acting as a clutch, chain 147 drives an appropriate shaft of gear box 148 which in turn drives infeed conveyor 40 via drive chain 56 and sprocket 57 as hereinbefore described. A motor drive assembly is not illustrated for the infeed conveyor 42, however it would be identical to that described for the index conveyor 40 above. Similarly, an output conveyor 66 (shown only in dotted lines in FIG. 2) would receive loaded trays from conveyor 40 and convey the loaded trays to a desired location for removal and further handling and/or packaging. The drive mechanism for such as outfeed conveyor 66 would be similar to that hereinbefore described for the index and infeed conveyors 40 and 42.

A tray 38 is shown in the proper indexed position on the tray index conveyor immediately opposite the discharge end of product transferring means 20 and parallel to the product conveyor 22. When the tray 38 is in such a proper indexed position, the transfer mechanism 20 will transfer a predetermined number of packaged products transversely from conveyor 22 into the loading tray. First and second limit switch assemblies 60 and 62 (see FIGS. 1 and 2) are spaced longitudinally along the index conveyor 40 and are engageable by the loading trays as they are moved by the conveyor. Limit switch 60 signals the transfer mechanism control circuit that a tray is in proper indexed position as will be hereinafter more full explained. Similarly, the second limit switch assembly 62 is engaged by a second tray 41 (shown in dotted lines in FIG. 2) and signals the control circuit that a second tray is properly positioned to follow the first tray for a second transfer of products by apparatus 20. The cooperation of limit switches 60 and 62 with the infeed and index conveyors and the transfer apparatus 20 via the control circuit will be hereinafter described in greater detail.

The transfer apparatus 20, as earlier described, is mounted between side plates 32 and has a closed end plate 34. Mounted on the downstream side plate 32 is a pneumatic cylinder operated gate assembly 68, while an identical gating means 70 is mounted on the inside of the upstream sidewall 32. Downstream or out gating assembly 68 comprises a generally rectangular gate 98 coupled to the shaft 102 of a pneumatic cylinder 100 by means of any suitable attaching or coupling device 103. (See FIGS. 1 and 6.) Cylinder 100 is suitably attached to the inside surface of side plate 32 in any conventional manner. The gate 98 is guided in its vertical movement by means of side guide rails 104 and roller guides 106. The gating means or in gate assembly 70 is identical to the gating means 68 hereinabove described, and no further description will be necessary for describing gating assembly 70.

Figure 7:
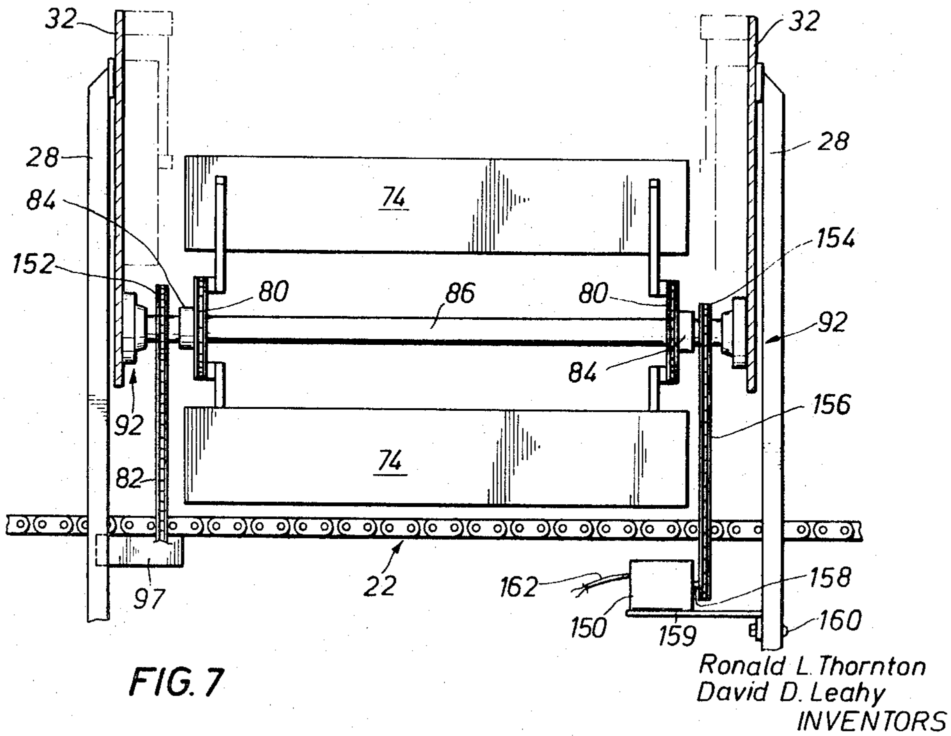
FIG. 7 is a partial detailed vertical cross-sectional view of the rear of the product transfer apparatus looking in the direction of transfer and showing the transfer drive mechanism and the cam switch drive mechanism.

The transfer mechanism itself is comprised of two rectangular paddles 74 mounted via paddle brackets 76 to elongated paddle attaching links 78 that are attached to a pair of spaced power driven chains 80. The two spaced chains 80 move transversely to the direction of flow of the packaged product conveyor 22. The chains are supported at either end of sprockets 84 mounted on transfer drive shaft 86 and the transfer idler shaft 87, each shaft being journaled in suitable shaft bearing assemblies 92 and 90, respectively. Support bars 94 extend transversely between opposite side walls 32 and lead rigidity to the frame assembly and act as basic structural supports for chain guides 96 which support the linked chains 80 throughout substantially their entire length. Drive shaft 86 is driven by means of a drive chain 82 passing over a drive sprocket 152 mounted on drive shaft 86 as shown in FIG. 7.

The paddle attaching links 78 are elongated and are pivoted at one end by means of a pin 73 attached to a link of chain 80, and each have a slotted portion 75 for accommodating a pin 77 projecting outwardly and fixed to links of chain 80. Pin 77 is free to move within the longitudinal slot 75 thus permitting paddle 74 to negotiate the rotational motion at each end of the chain drive about sprockets 84. The forward portion of link 78 pivots about laterally projecting pin 73, thus allowing link 78 free movement with respect to pin 77.

Figure 3:
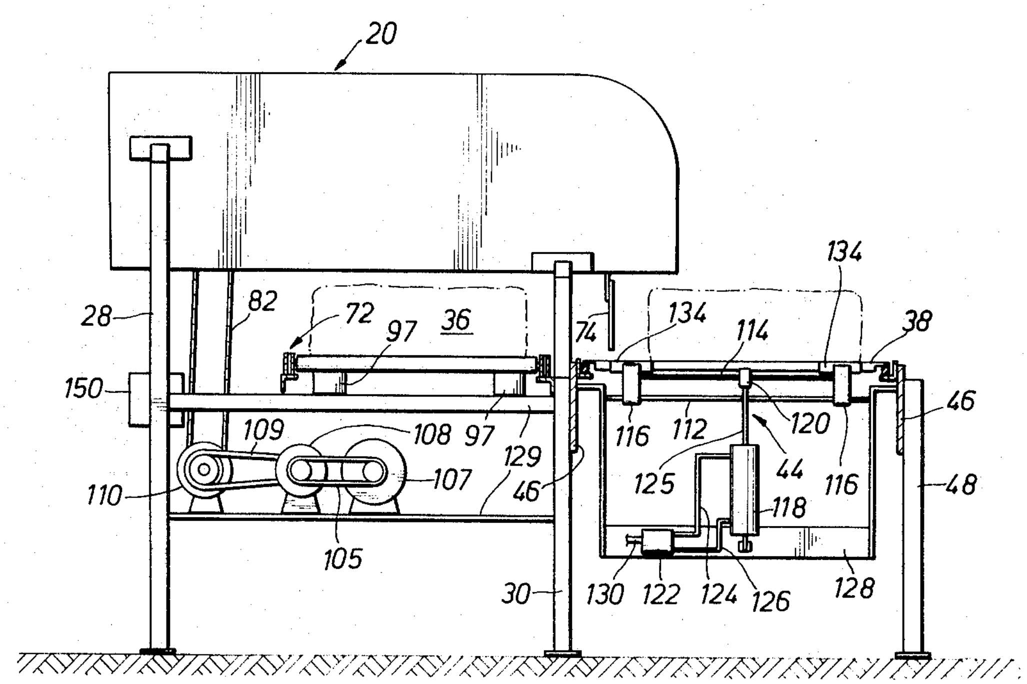
FIG. 3 is an end view of the packaged product conveyor showing the product transfer apparatus mounted above the conveyor and the parallel relationship of the infeed and index conveyors adjacent the discharge end of the transfer apparatus.

As may readily be seen, paddles 74 sweep transversely across the moving conveyor 22 to move any packaged products within the space between the in and out gating means or assemblies 70 and 68, respectively. Referring to FIG. 3, the chain driven paddles 74 are powered by means of a conventional electrical motor 107 shown mounted on the structural frame 129 of conveyor 22. Motor 107 drives a clutch-brake assembly 108 by means of a belt drive 105. The clutch-brake 108 is identical to the clutch-brake 146 earlier described in connection with the index and infeed tray conveyors 40 and 42. When clutch brake 108 is acting as a clutch, a gearbox 110 is driven by means of belt 109, the drive shaft of gearbox 110 being connected to the drive chain 82 by means of a drive sprocket (not shown). Chain 82 drives transfer drive shaft 86 as hereinbefore described.

A sprocket 154 is mounted on the opposite end of drive shaft 86 from the drive sprocket 152 for driving the shaft 158 of a cam box 150 by means of a chain 156. Cambox 150 is mounted on a bracket 159 conventionally attached to the support frame 28 of the product conveyor 22 and transfer mechanism 20 by any conventional attaching means such as the bolt and nut as shown at 160. Cambox 150 contains four cam switches that are driven synchronously with the rotation of drive shaft 86 and signal to the control circuit the initiation and ending of each transfer cycle. The cam switches are connected with the control circuit via conductors passing through tubing 162 and interact in the control circuit as will be hereinafter more fully described.

Figure 6:
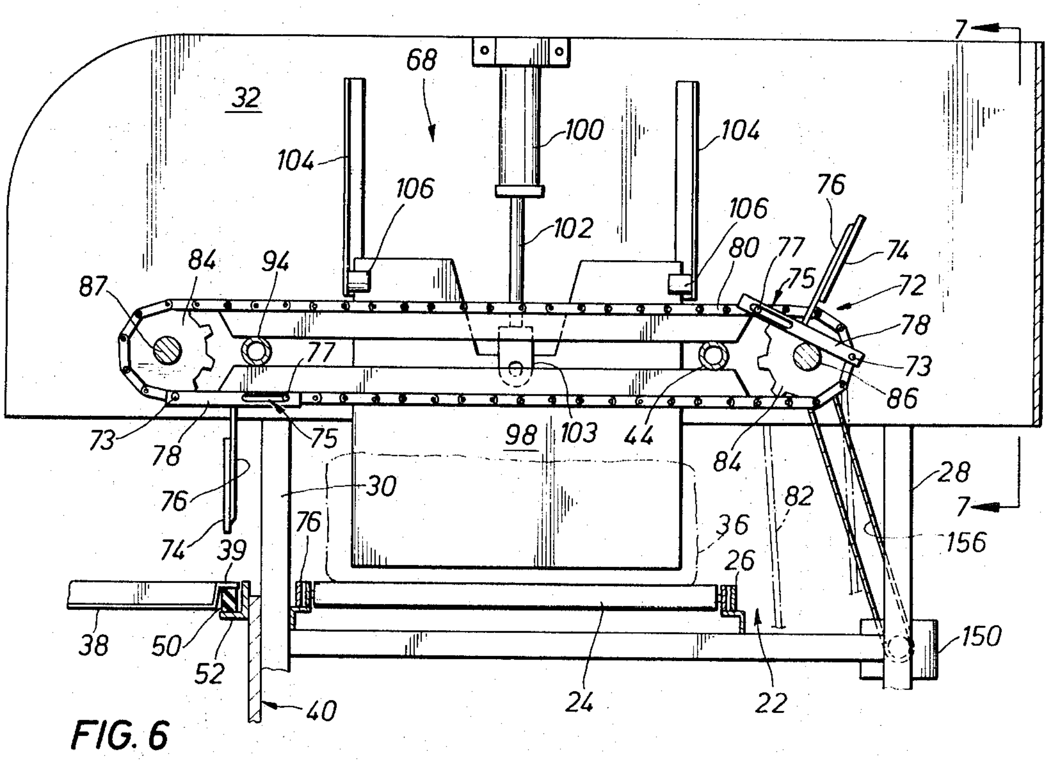
FIG. 6 is a detailed vertical cross-sectional view of the product transfer apparatus and the packaged product conveyor illustrating a typical gate assembly with the gate lowered and the chain driven transfer mechanism.

A conventional photocell light source 164 is mounted on the exterior wall 32 for directing a beam of light downwardly toward the center of the moving packaged product conveyor 22. The beam of light 168 will be reflected by packaged products 36 passing through the light beam and will be directed to a photocell pickup device 166. Photocell assembly 164 and 166 is utilized to count the number of packaged products passing the in gate assembly 70 after the out gate assembly 68 has been actuated to lower gate 98 downwardly as shown in FIG. 6 to arrest the passage of one of the packaged products moving along conveyor 22. After a certain predetermined number of packaged products has moved into the space between gating means 68 and 70 the control circuit actuates the pneumatic cylinder 100 of in gate assembly 70 thus lowering the gate 98 of gating means 70 for arresting the entry of any additional packaged products 36 while the transfer operation takes place. Of course, the photocell 164 in its pickup 166 may be advantageously positioned in other locations to effect the counting process. However, applicants have found that the reflection technique shown has been most reliable.

When in gate assembly 70 has closed after the requisite number of loaves has entered the transfer chamber, a few loaves may stack up against in gate 98. When in gate assembly 70 reopens to allow entry of additional loaves, the loaves stacked against in gate 98 would be counted as one unit, since there is no separation between the loaves. In order to pull a separation and accomplish accurate counting of additional loaves entering the transfer area, a pair of ruber-covered blocks 97 (see FIGS. 1, 3 and 7) are provided that contact the power-free rollers 24 in the area just ahead of the in gate 98 and into the transfer chamber. The longitudinal contact of blocks 97 have advantageously been found to be six or eight inches thus providing rapid counterclockwise motion to three or four rollers entering the transfer area. A loaf engaging the powered or rapidly turning rollers passing over blocks 97 is kicked or quickly propelled into the transfer chamber at a rate of lateral movement faster than the speed of the other conveyor moved loaves 36.

Thus, the first of any stacked loaves is separated from the second loaf just long enough to break the reflected photocell light beam 168 and start a new counting sequence. The same process separates any additional stacked loaves for counting until loaves in their normal spaced sequence are again encountered.

Figures 4, 5:
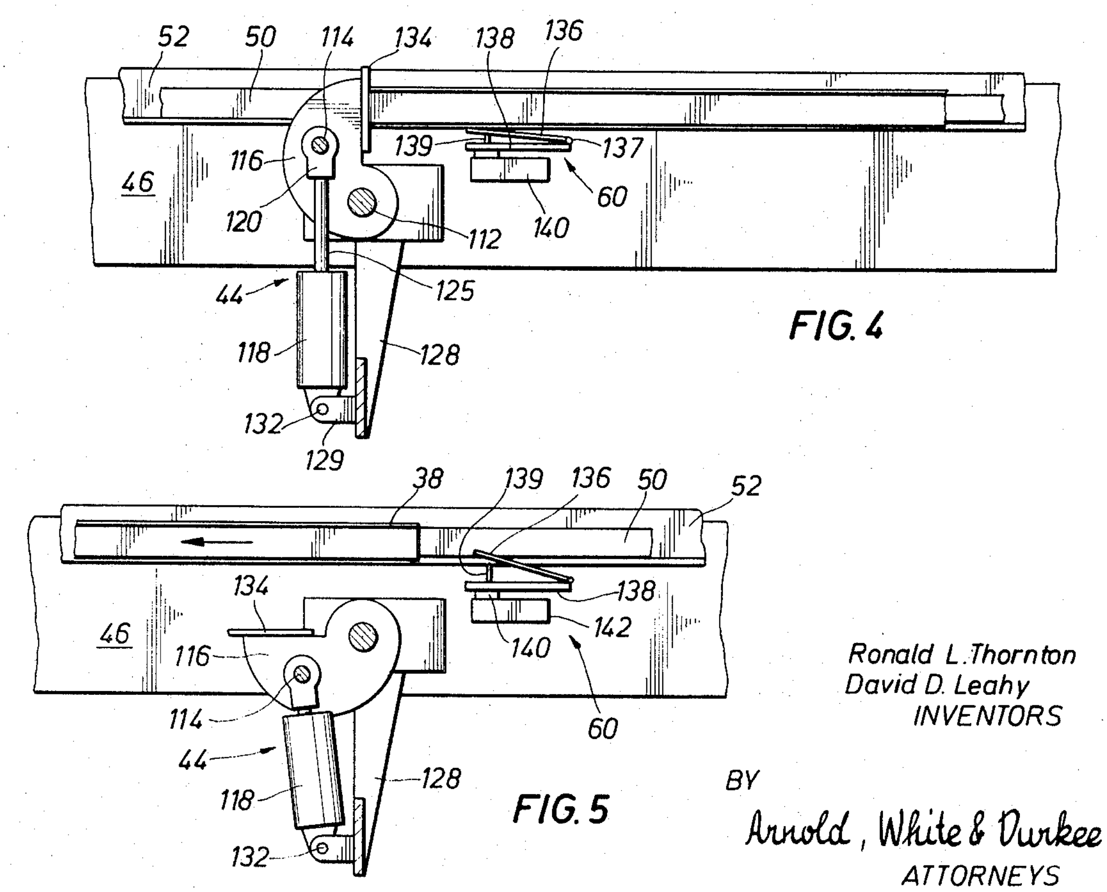
FIG. 4 is a partial detailed vertical cross-sectional view of the tray stopping apparatus cooperating with the loading index conveyor for stopping a loading tray.
FIG. 5 is a partial detailed vertical cross-sectional view of the stopping apparatus shown in its retracted position to allow the loading tray to pass over the stopping means and be carried away from the proper index position by the index conveyor after the transfer of the packaged products has taken place.

As may be seen in FIGS. 1, 3, 4 and 5, a tray stopping means 44 is employed to physically stop a loading tray 38 in the proper indexed position and hold the tray in registration with the discharge end of the transfer mechanism 20. The tray stopping mechanism 44 is mounted on a supporting frame 128 attached to the structural side members 46 and the frame 48 of the infeed tray conveyor 40. A pair of semicircular tray stops 116 are mounted for rotation on a tray stop axle 112 and are laterally interconnected by means of an operating rod 114. A pneumatic cylinder 118 is pivotally connected by means of a bracket 129 and pin 132 to the supporting frame 128. The shaft of cylinder 118 is rotationally mounted via a coupling 120 to the operating rod 114. Cylinder 118, when actuated via compressed air tubing lines 124 and 126 passing through a regulator valve 122 and receiving compressed air 130 from a central source (not shown), will hold the two semicircular tray stops 116 in a vertical position as shown in FIG. 4, or when the cylinder shaft 125 is retracted will move tray stops 116 into a horizontal position and allow the overhead passage of a tray 38 (see FIG. 5).

Tray stops 116 pivot about axle 112 while shaft coupling 120 is free to rotate about operating rod 114 and the base of the cylinder 118 is mounted for rotation in bracket 129 by a pivot pin 132. Rectangular stop plates 134 are mounted horizontally to the front face of the tray stops 116 for providing a greater physical contact surface area with each tray 38 as it is indexed into position. As may be seen in FIG. 4, when the cylinder 118 is actuated to fully extend shaft 125, the tray stops are positioned so that the stop plates 134 are in vertical alignment and block the movement of a tray 38 on conveyor belt 50 of the index conveyor 40. When shaft 125 of cylinder 118 is fully retracted tray stops 116 and the mounted stop plates 134 are retracted to a horizontal position out of contract with a tray 38 allowing the tray to pass over the tray stop and leave the index conveyor 40.

Mounted just ahead of the tray stopping apparatus 44 is a first limit switch assembly 60. Limit switch assembly 60 comprises a microswitch 140 having an actuating plunger 139 mounted on a plate 138 to the frame of the index conveyor 40. A pressure plate 136 is pivotally mounted by a pin 137 to the support bracket 138 and makes physical contact with microswitch plunger 139. As shown in FIG. 5, when a tray 38 is not in contact with pressure plate 136, plunger 139 of microswitch 140 is fully extended and the switch is not actuated. However, as a tray 38 moves into the index position and the tray stopping assembly 44 has been actuated to its vertical position, as shown in FIG. 4, the bottom surface of the tray 38 will ride over the pressure plate 136, depress plunger 139, and actuate limit switch 140. When limit swich 140 has been actuated, the control circuit is signaled that a tray has been indexed in the proper position for a transfer of packaged products from the product conveyor 22, and at the same time halts the operation of the index conveyor 40 as will be hereinafter more fully described. Limit switch assembly 60 may be adjusted so that the index conveyor 40 stops the tray just as it makes physical contact with stop plate 134 to prevent contact of the leading edge of tray 38 with the stop plate 134 and preventing any "bounce back" of the tray.

Figure 2:
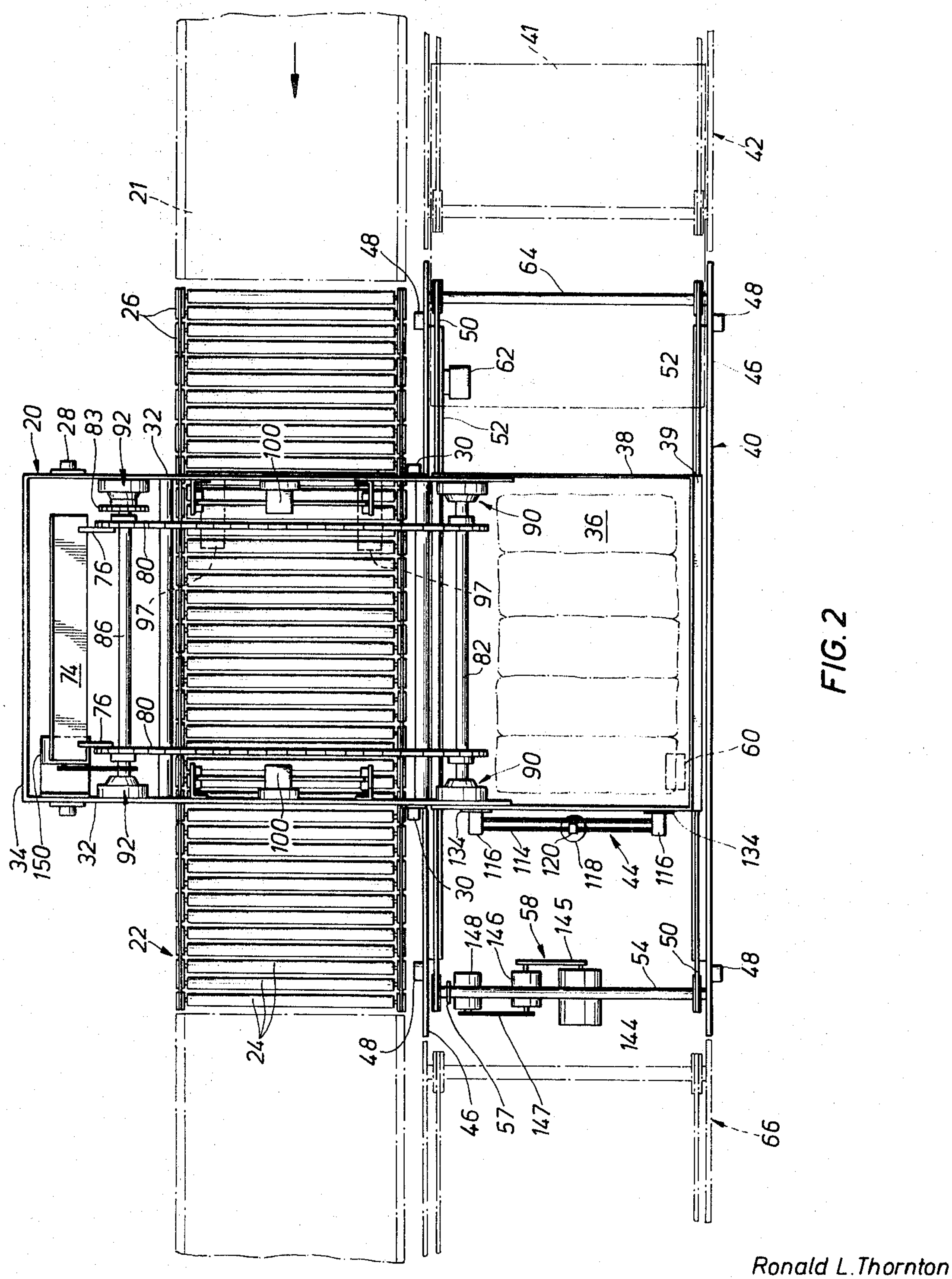
FIG. 2 is a plan view of the packaged product conveyor, the product transfer apparatus, and the relationship of the infeed and index tray conveyors, and further illustrating the relationship of a properly indexed loading tray to the transfer apparatus.

As may be more readily seen in FIG. 2, the infeed conveyor 42 will feed another tray 41 into the index conveyor 40, previously stopped by the action of the first tray 38 tripping the first limit switch assembly 60. The continued conveyor action of infeed conveyor 42 pushes a second loading tray 41 onto the previously stopped index conveyor 40 until tray 41 contacts and depresses pressure plate 136' of limit switch assembly 62. Limit switch assembly 62 is identical in construction to the previously described limit switch 60. As soon as the microswitch 140' of the second limit switch assembly 62 has been actuated, the infeed conveyor 42 will be shut off during the transfer operation as will be hereinafter more fully explained.

Typically, loading trays for receiving packaged loaves of bread either are capable of holding five or ten loaves of bread as a standard throughout the industry. Of course, if other packaged products were being transferred, other combinations or counts of products may be utilized. However, for the transfer of packaged loaves of bread, a function for which the invention herein is ideally suited, the transfer mechanism 20 would be designed to transfer five packaged loaves of bread during each transfer cycle into an indexed loading tray 38. By referring now to FIGS. 1 through 8, the typical operation of an automatic packaged product tray loading apparatus according to this invention will be more fully described. For example purposes only, the packaged products will be considered to be packaged loaves of bread as shown at 36 in the figures, and that the loading capacity of each loading tray is five loaves.

Figure 8A:
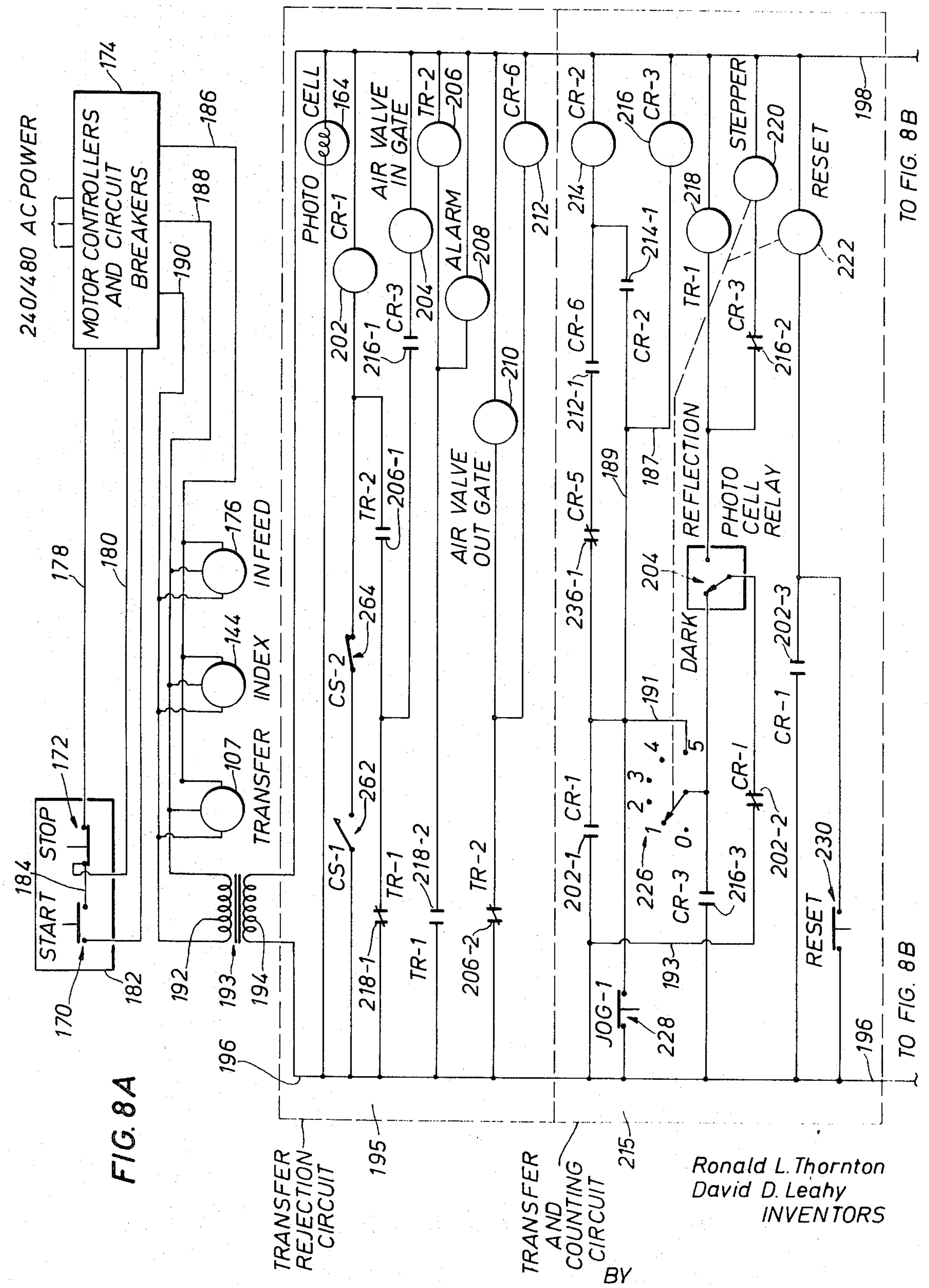
FIGS. 8A and 8B are a detailed electrical schematic of one embodiment of a typical tray loading apparatus.
Figure 8B:
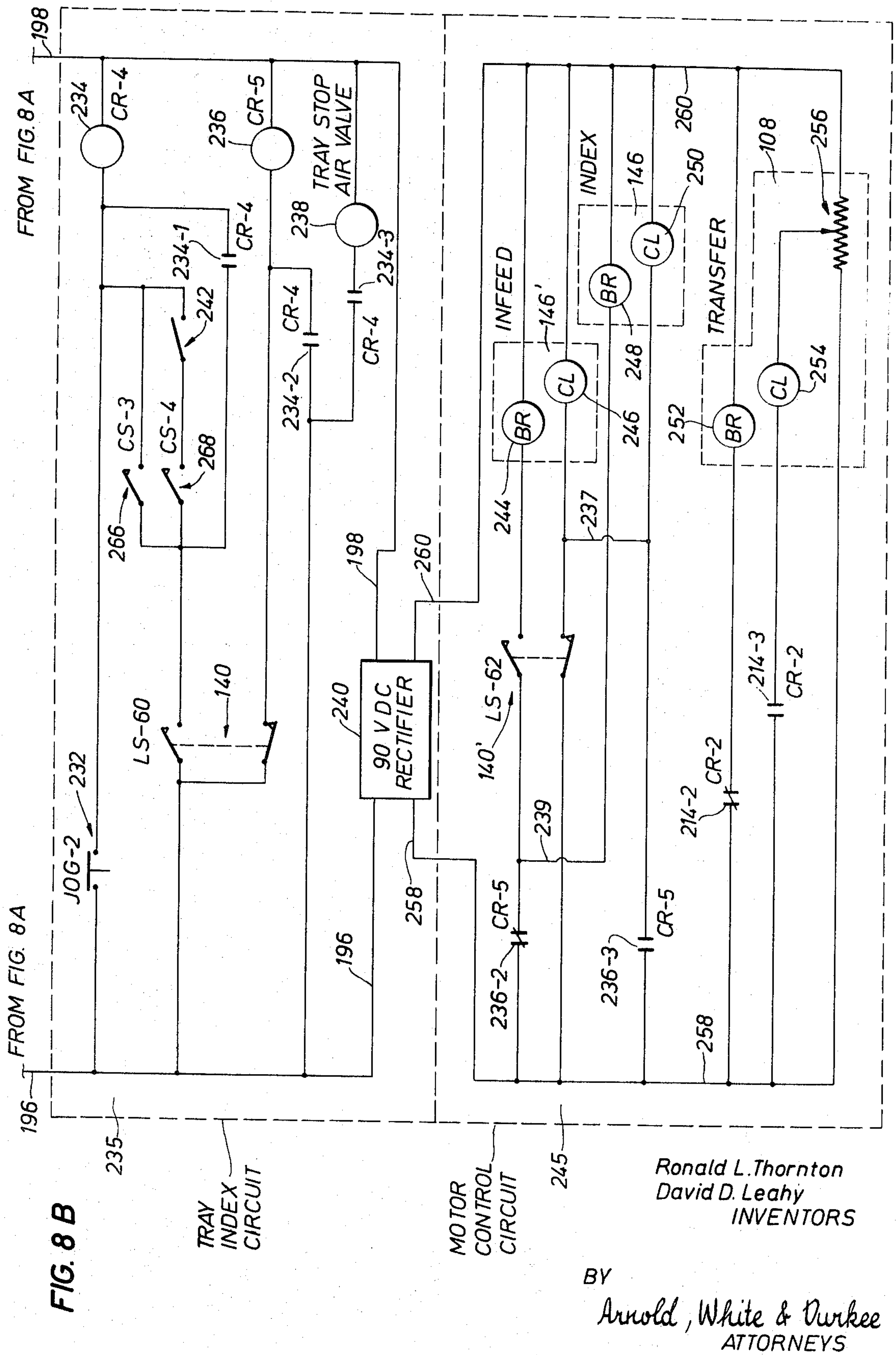

Referring particularly to the control system schematic shown in FIGS. 8A and 8B, and to FIGS. 1–7, if the start switch 170 is depressed, 240 or 480 volt AC power from an external source is applied to appropriate motor conventional controllers and circuit breakers 174 via conductor 178 through the closed stop switch 172 and conductor 184, switch 170 and conductor 182. The AC output of circuit 174 applies three-phase AC power via conductors 186, 188 and 190 to the transfer motor 107, the index conveyor motor 144 and the infeed conveyor motor 176. In addition, AC power via conductors 188 and 190 is applied to the primary winding 192 of a power transformer 193. As soon as the start switch 170 has been depressed the transfer, index and infeed motors 107, 144 and 176 are energized and run continuously during the transfer operations. However, the output of each of the motors will be applied through appropriate clutch-brake mechanisms, as hereinbefore generally described, and as will be hereinafter more fully described to drive the transfer mechanism and the index and infeed tray conveyors.

The secondary winding 194 of the power transformer 193 applies AC power via conductors 196 and 198 to the transfer-rejection circuit 195, the transfer and counting circuit 215, and the tray index circuit 235. Conductors 196 and 198 terminate as inputs to a 90-volt DC rectifier circuit 240, whose output is applied via conductors 258 and 260 as inputs to the motor control circuit 245.

The schematic shown in FIGS. 8A and 8B show the control circuitry for a packaged product tray loading apparatus having the capability of a rejection cycle in the event that a tray 38 is not properly indexed into position in the index conveyor 40, or other malfunction. If such a rejection cycle occurs the downstream or out gate assembly 68 is actuated so that the out gate 98 would be raised and allow any accumulated bread loaves within the space between gate assemblies 68 and 70 to be moved by conveyor 22 out of the transfer mechanism and downstream of the conveyor without stopping the main conveyor 22. The products would simply be allowed to pass through the transfer mechanism until such time as the transfer mechanism recycled, a malfunction was repaired, or a tray 38 was properly indexed into position in the index conveyor 40.

With the start-up procedure earlier described, transfer motors 107 and the index and infeed conveyor motors 144 and 176 are energized and operating. With no trays present in the index conveyor 40, the microswitch 140 of limit switch assembly 60 will be in the condition shown in FIG. 8B, with one switch contact normally closed and the other normally open. Similarly, the microswitch 140' of limit switch assembly 62 will have one contact normally closed and the other normally open. With microswitch 140 not actuated, the coil 236 of relay CR5 is energized via conductor 196 and the closed contact of microswitch 140 and of conductor 198. With the coil 236 of relay CR5 energized, relay contacts 236–3 of CR5 are closed, thereby completing the circuit between conductors 258 and 260 through switch contacts 236–3 of CR5 and the clutch coil 250 of the clutch-brake assembly 146, thereby driving the tray index conveyor 40.

Simultaneously, DC power is applied via conductor 258 and the closed contact of microswitch 140' of limit switch assembly 62, to energize the clutch coil 246 of the infeed clutch-brake assembly 146', thereby turning on the tray infeed conveyor 42. Coil 214 of relay CR2 (see FIG. 8A) is normally deenergized, and the relay contacts 214–2 of CR2 are normally closed applying DC power via conductor 258, and the closed contact 214–2 to energize the brake coil 252 of the clutch-brake assembly 108 of the transfer drive assembly. The clutch coil 254 of the clutch-brake assembly 108 of the transfer drive assembly is deenergized since contact 214–3 of relay CR2 is open while relay CR2 is deenergized.

Coil 210 of the out gate air valve is energized via conductors 196, 198 and the normally closed contacts 206–2 of the delay-off relay TR2. When coil 210 is energized, the air valve in the compressed air line to pneumatic cylinder 100 in the out gate assembly 68 applies compressed air to cylinder 100 thereby operating gate 98 to its lowered position to arrest the movement of one of the packaged loaves of bread 36 moving through the transfer mechanism on conveyor 22. The loaves 36 are normally spaced at some predetermined interval and as additional loaves continue to move on the conveyor 22 they and the succeeding ones of the loaves will contact the loaf that was first stopped by out gate assembly 68 until a predetermined number of loaves has entered the transfer mechanism.

As was hereinbefore generally described, the photocell 164, energized via conductor 196, the coil of photocell 164 and conductor 198 will direct a beam of light energy that will be reflected from each of the wrappers of the loaves of bread as they intercept light beam 168 (see FIG. 1). The reflected beam 168 from the wrapper of the bread loaves will be reflected to the pickup 166 having therein a photocell relay 204 that is responsive to the presence or absence of a reflected beam of light 168. Photocell relay 204, as shown in FIG. 8A, will have its movable wiper in the DARK position shown when there is no light beam reflected. However, as each loaf of bread 36 passes the light beam 168 and is reflected to photocell pickup 166, the photocell relay 204 is triggered to the REFLECTION position applying a momentary electrical pulse to the coil 218 of a delay-on timer relay TR1 via conductor 196, the normally closed contacts 202–2 of relay CR1, the photocell relay 204 and the return conductor 198. However, since the timer relay TR1 is a delay-on relay, the short period during which the electrical voltage is applied to coil 218 of relay TR1 during a reflection is not sufficient to energize the relay since the time period is less than the delay-on time of coil 218.

However, simultaneously with the application of a momentary electrical pulse to the delay-on coil 218 of timer TR1, the same pulse is applied via the normally closed contacts 216–2 of relay CR3 to energize coil 220 of the stepper switch 226. Switch 226 is a conventional stepping switch, having a movable wiper arm which moves one position each time coil 220 is energized. In this way, stepper switch 226 counts each loaf of bread as it interrupts and reflects the light beam 168 and energizes photocell relay 204.

Meanwhile, as the first tray 38 enters the index conveyor 40 from infeed conveyor 42, the bottom of tray 38 will engage the pressure plate 136′ of the second limit switch assembly 62 and actuate microswitch 140′. With microswitch 140′ actuated, clutch coil 250 of the clutch-brake mechanism 146 of the index conveyor is not affected and the index conveyor continues to run. Similarly, although microswitch 140′ has been actuated, clutch coil 246 of the infeed conveyor clutch-brake mechanism 146′ will continue to be energized via conductor 258, the closed contacts 236–3 of relay CR5, conductor 237, clutch coil 246 and conductor 260 to continue operation of the infeed conveyor. The first tray 38 will ride over limit switch assembly 62 and microswitch 140′ will return to its deactuated condition, with limit switch 140′ again having one contact closed for maintaining energization of clutch coil 246.

Next, tray 38 will engage the pressure plate 136 of the first limit switch assembly 60 thereby actuating microswitch 140 and deenergizing coil 236 of relay CR5. With microswitch 140 of limit switch assembly 60 actuated, and the coil 236 of relay CR5 deenergized, contacts 236–2 of CR5 are closed and voltage is applied via conductor 258, the closed contacts 236–2 of CR5 and conductor 239 to energize the brake coil 248 of the clutch-brake mechanism 146 of index tray conveyor 40. At the same time, the clutch coil 250 is deenergized since contacts 236–3 of relay CR5 are opened, and the index tray conveyor 40 stops tray 38 in its proper indexed position against stop plates 134 of the stopping means 44.

However, the infeed conveyor 42 continues to run, sending a second tray 41 (see FIG. 2) onto the stopped index conveyor 40 until the second tray 41 contacts the pressure plate 136′ of the second limit switch assembly 62, thereby actuating microswitch 140′. When microswitch 140′ is actuated, the brake coil 244 of the clutch-brake mechanism 146′ of the infeed tray conveyor 42 is actuated via conductor 258, the closed contacts 236–2 of relay CR5, and the now closed contacts of microswitch 140′, the brake coil 244 and conductor 260. Simultaneously, the clutch coil 246 of the clutch-brake mechanism 146′ of the infeed conveyor 42 is deenergized, since the normally closed contact of microswitch 140′ is opened upon actuation by tray 41 and the bypass route via conductor 237, above described, is also open since contacts 236–3 of CR5 are opened when relay CR5 was deenergized by limit switch assembly 60. Thus, when the second tray 41 has actuated the second limit switch assembly 62, the brake coil 244 of the clutch-brake device 146′ will be energized and infeed conveyor stops.

When two trays 38 and 41 are thus positioned, the control circuit is enabled and the transfer mechanism will be actuated as will be hereinafter described. As previously mentioned, coil 210 of the out gate air valve is energized and the downstream gate assembly 68 will be actuated to arrest the movement of one of the bread loaves moving along conveyor 22. As the bread loaf is stopped, the free rollers 24 merely roll beneath the bread loaf and do not cause any appreciable forward thrust against the inside of gate 98 of gate assembly 68. Additionally, as above described, additional loaves contact the halted first loaf and the movement of the additional loaves of bread will be arrested in the space between the spaced side panels 32, hence the spaced apart gate assemblies 68 and 70.

Simultaneously, as above described, the photocell 164 and photocell pickup 166 have been counting the number of loaves passing the upstream side plate 32, including the upstream gate assembly 70, and when the fifth loaf has passed, stepper switch 226 will be stepped to its number 5 position. When the switch of the photocell relay 204 returns to the DARK position after the fifth loaf has passed gate assembly 70, and with the movable wiper arm of stepper switch 226 in the 5 contact position, electrical voltage is applied via conductors 196 and 193, the closed contacts 202–2 of relay CR1, photocell relay 204, stepper switch 226, conductors 191, 189 and 187 to the coil 216 of relay CR3 and to the return conductor 198, thus energizing relay CR3. As soon as the coil 216 of relay CR3 has been energized, contacts 216–3 of CR3 are closed and maintain the circuit to coil 216 via conductor 196, the closed contacts 216–3 of CR3, stepper switch 226 in its 5 contact position, conductors 191, 189 and 187 to maintain relay CR3 in its energized state.

Simultaneously with the energization of relay CR3, voltage applied via conductor 196, the normally closed contacts 218–1 of timer relay TR1, and the now closed contacts 216–1 of relay CR3, energizes coil 204 of the in gate air valve for operating pneumatic cylinder 100 of the upstream gate assembly 70, thus closing gate 98 of gate assembly 70 and arresting the further movement of bread loaves 36 into the transfer mechanism. When the in gate assembly 70 is actuated, five loaves of bread will be arrested within the space between the out and in gate assemblies 68 and 70, and in position for transverse transfer from the conveyor 22 to the waiting properly indexed loading tray 38.

At the same time that coil 210 of the out gate air valve controlling pneumatic cylinder 100 of the out gate assembly 68 was energized, the coil 212 of relay CR6 was also energized via conductor 196 and the normally closed contacts 206–2 of the delay-off timer relay TR2. With CR6 energized, while the voltage is being applied via stepper switch 226 in the 5 contact position to energize coil 216 of relay CR3, simultaneously voltage is applied via stepper switch 226 in the 5 contact position, conductor 191, the closed contacts 236–1 of the now deenergized relay CR5, and the closed contacts 212–1 of the now energized relay CR6 to energize coil 214 of relay CR2.

When coil 214 is energized, the normally closed contacts 214–2 of relay CR2 in the motor control circuit 245 are opened, thereby breaking the circuit to the braking coil 252 of the clutch-brake mechanism 108 of the transfer drive assembly, and simultaneously energizes clutch coil 254 of clutch-brake assembly 108 via the closed contacts 214–3 of relay CR2 to operate the transfer means 20 as hereinbefore described. The output of clutch coil 254 is connected via a rheostat 256 to the return conductor 260. Rheostat 256 provides a means of adjustment of the clutch coil 254 voltage and thus permits a measure of clutch slippage for less abrupt transfer action.

As hereinabove described, drive chain 82 drives shaft 86 causing chains 80 to move in a clockwise direction, moving a paddle 74 transversely across conveyor 22 and sweeping the five loaves of bread from the conveyor to the loading tray 38. When the transfer cycle begins and shaft 86 is rotated, the hereinbefore mentioned cam switches in cam box 150 are also rotated via cam drive chain 156. The four cam switches are CS1, CS2, CS3 and CS4, reference numbers 262, 264, 266 and 268 as shown in FIGS. 8A and 8B.

Figure 10:
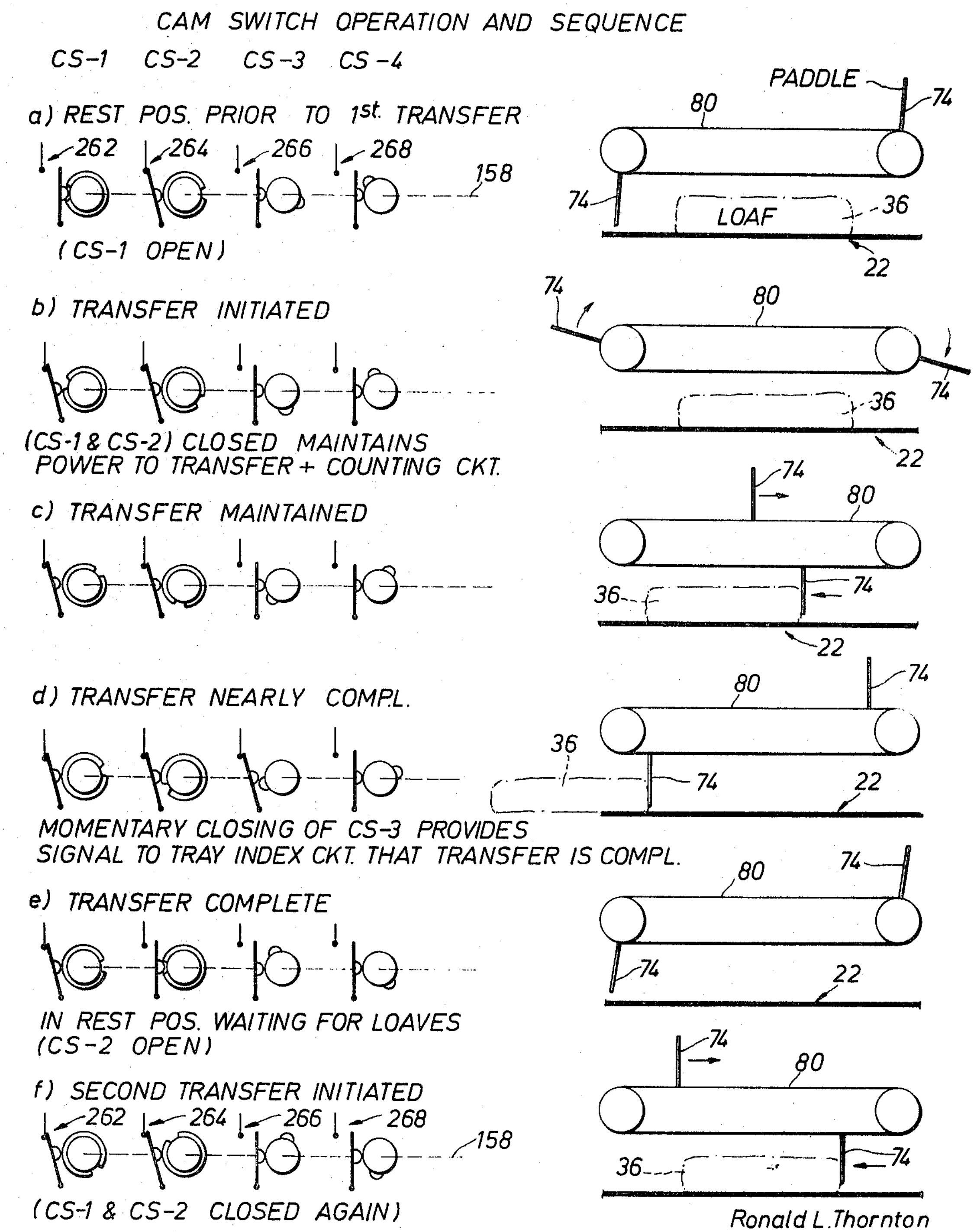
FIG. 10 is a pictorial representation of the cam switch operation sequence during a typical transfer operation.

Referring to FIG. 10, the sequence of cam switch operation in relation to the transfer cycle is shown. In FIG. 10*a*, just prior to initiation of the transfer cycle, paddles 74 are at rest and loaves 36 are positioned for transfer from conveyor 22. A typical position relationship of cam switches 262, 264, 266 and 268 (CS1, CS2, CS3 and CS4, respectively) are shown diagrammatically. One of the cam switches 262 or 264 will be open and the other closed. For purposes of describing the cam switch sequence of operation, it will be assumed that cam switch 264 (CS2) is closed and cam switch 262 (CS1) is open just prior to initiation of the transfer cycle as shown in the schematic of FIG. 8A. Cam switches 266 and 268 (CS3 and CS4) will always both be open prior to initiation of the transfer cycle.

Referring now to FIGS. 1 through 8 and 10, once the transfer cycle has been initiated upon the energization of coil 214 of relay CR2, cam switch 262 (CS1) is immediately closed (see FIG. 10*b*) by the rotation of cam switch 158. When cam switch 262 (CS1) closes, coil 202 of relay CR1 is energized via conductor 196, closed cam switches 262 and 264. With the energizing of relay CR1, relay contacts 202–1 of CR1 will be closed and maintain the energization of coils 214 and 216 of relays CR2 and CR3, respectively. CR2 remains energized via conductor 196, the closed contacts 202–1 of CR1 the normally closed contacts 236–1 of the deenergized CR5, and the closed contacts 212–1 of energized CR6. At the same time, relay contacts 214–1 of CR2 are closed and latch CR2 in its energized state regardless of the state of contacts 236–1 of CR5 or 212–1 of CR6.

With CR1 energized, contacts 202–2 of relay CR1 are opened, thereby breaking the circuit to the photocell relay 204 via conductors 196 and 193. Simultaneously, voltage is applied via conductor 196 and the closed contacts 202–3 of CR1 to energize coil 222 of a reset relay with resets stepper switch 226 to the 0 contact position. With stepper switch 226 reset to the 0 position, the circuit via photocell relay 204, the stepper switch 226, and conductor 191 will now be opened, hence the need for the energizing of relay CR1 to maintain CR2 and CR3 in the energized state as described above.

It will be noted than when the upstream or in gate assembly 70 closes, the next loaf of bread arrested by gate 98 of gate assembly 70 will cause a constant reflection between photocell 164 and the photocell pickup 166 causing the photocell relay 204 to remain in the reflection position thereby applying voltage to the coil 218 of the delay-on timer relay TR1. This energization voltage to coil 218 will be applied for a short period of time after the transfer operation has been initiated and until cam switch 262 (CS1) closes and energizes relay CR1, since the circuit through the photocell relay 204 will be broken upon energization of CR1 because of the opening of the normally closed contacts 202–2 of relay CR1. If the time delay to the energization of CR1 is less than the delay-on time of the coil 218 of timer relay TR1, TR1 will not be energized.

However, if there is a malfunction and the delay-on time of coil 218 is exceeded, timer relay TR1 will be energized. The consequences of the energizing of TR1 and TR2 will be hereinafter more fully described. During the transfer cycle, cam switches 262 and 264 (CS1 and CS2) will remain closed as may be seen in FIGS. 10*c* and 10*d*.

Once the transfer operation is nearly completed there will be a momentary closing of cam switch 266 (CS3) that will energize coil 234 of relay CR4 thus closing contacts 234–1 of CR4 and latching the relay CR4 in the energized state via conductor 196, the closed contact of the microswitch 140 and the closed contacts 234–1. When relay CR4 is energized, contacts 234–2 and 234–3 of CR4 are closed and coil 236 of relay CR5 is energized via conductor 196 and the closed contact 234–2 of CR4. Cam switch 266 (CS3) will only be closed momentarily (see FIGS. 10*d* and 10*e*) and then will reopen. However, the coil 234 of relay CR4 remains energized by the latching action as hereinabove described through its closed contacts 234–1. As soon as relay CR5 has been energized, relay contacts 236–1 of CR5 in the transfer and counting circuit 215 are opened and relay contacts 236–2 and 236–3 are opened and closed, respectively.

Almost simultaneously with the energization of relay CR5, the cam switch operation is completed when the transfer cycle is completed (see FIG. 10*e*) with cam switches 264, 266 and 268 open and cam switch 262 closed. With the opening of cam switch 264 the coil 202 of relay CR1 is deenergized, thereby deenergizing relays CR2 and CR3 by the opening of contacts 202–1 and 202–3 of CR1. Contacts 202–2 of relay CR1 close thereby enabling the photocell relay 204 again for a new cycle.

When relay CR5 is energized, the circuit to the brake coil 248 of the index clutch-brake mechanism 146 is opened via contacts 236–2 of CR–5, while the clutch coil 250 is energized via the closing of contacts 236–3 of CR5, thereby restarting the operation of the index conveyor 40. Simultaneously with the energization of relay CR4 when cam switch 266 was momentarily operated, the closing of relay contacts 234–3 of CR4 energized coil 238 of the tray stop air valve 122 (see FIG. 3), thus operating pneumatic cylinder 118 of the stopping means 44 and retracting the semicircular tray stops 116 to the horizontal position shown in FIG. 5, and allowing the loaded tray 38 to be moved from the index position by index conveyor 40.

As soon as relay CR2 is deenergized, the clutch-brake mechanism 108 of the transfer apparatus 20 has its brake coil 252 energized while the clutch coil 254 is deenergized, thus ending the transfer cycle. As soon as the loaded tray 38 clears the index position of index conveyor 40, and disengages from the pressure plate 136 of the first limit switch 60, the circuit to coil 234 of relay CR4 is broken by the open contacts of microswitch 140. However, with the closing of the other contact of microswitch 140, the relay coil 236 of relay CR5 remains energized and the index conveyor 40 continues in operation. Simultaneously with the deenergization of coil 234 of relay CR4, the coil 238 of the tray stop air valve 122 is deenergized, and pneumatic cylinder 118 of the stopping means 44 is operated to rotate the tray stops 116 to their vertical position in preparation for stopping the next tray in the proper indexed position.

When the index conveyor 40 starts operating, and CR5 is energized upon closure of cam switch 266, the infeed conveyor 42 (see FIG. 2) also resumes operation. The clutch-brake mechanism 146′ of the infeed conveyor has its brake coil 244 deenergized even though microswitch 140′ of the second limit switch 62 remains closed because of the opening of contacts 236–2 of relay CR5. The clutch coil 246, on the other hand, is energized via conductor 258, the closed contacts 236–3 of CR5 and the jumper conductor 237. Since both the index and infeed conveyors, 40 and 42 respectively, are now operating, the second tray 41 (see FIG. 2) moves into the index conveyor 40 and is moved forward to the proper indexed position where the first limit switch 60 is engaged, stopping tray 41 in the proper indexed position adjacent the transfer mechanism and in physical contact with the tray stops 116 and 134 as was herein above earlier described for tray 38. Similarly, another tray (not shown) traveling from infeed conveyor 42 will enter index conveyor 40 and engage the second limit switch assembly 62 and again start the transfer cycle hereinabove described.

It should be noted by reference to FIG. 10, that in each cycle only one of the cam switches 266 and 268 are momentarily closed. In the transfer cycle above described cam switch 266 was momentarily closed to signal the end of the transfer cycle. On the next transfer cycle cam switch 268 will momentarily close to signal the end of the second transfer cycle. The cam switches 266 and 268 alternately close on each succeeding transfer cycle. In FIG. 8B, a SPST switch 242 is shown in series with cam switch 268. If the SPST switch 242 is closed, on the second transfer cycle when cam switch 268 closes momentarily the coil 234 of relay CR4 will be energized thus signalling the end of the second transfer cycle and energizing coil 236 of relay CR5 and restarting the operation of the infeed and index conveyors 42 and 40, as hereinbefore described.

However, as earlier mentioned, some loading trays have a ten loaf capacity. Switch 242 provides the means to operate the transfer apparatus 20 to load selectively five or ten loaves of bread. If the SPST switch 242 is left open, then cam switch 268 is momentarily closed on the first transfer cycle, no energizing voltage is applied to coil 234 of relay CR4 and CR4 remains deenergized as does relay CR5. This means that the index and infeed conveyors 40 and 42, respectively, will not be restarted after the first transfer cycle and a properly indexed tray will remain while a second transfer cycle occurs and a second five loaves are transferred. If cam switch 268 closes on the first transfer, then cam switch 266 (CS3) will close on the second cycle and energize coil 234 of relay CR4, signalling the end of the transfer cycle. In this way, SPST switch 242 may be utilized to cause the control circuit of FIGS. 8A and 8B to load five or ten loaves, selectively.

Reset switch 230 provides a manual means of energizing the relay coil 222 of the reset relay when desired so that the stepper switch 226 may be reset at any time. Similarly, the "jog" switch 228 provides a manual override control to energize coils 214 of relay CR2 to initiate the transfer cycle on any unit count. Jog switch 232 overrides the function of cam switches 266 and 268 (CS3 and CS4) to energize coil 234 of relay CR4 to initiate operation of the index and infeed conveyors 40 and 42 respectively.

In the event timer relay TR1 (delay-on) is energized as hereinbefore mentioned, normally closed contacts 218–1 of TR1 will open and coil 204 of the in gate air valve will be deenergized, thus opening the upstream in gate assembly 70 and simultaneously energizing coil 206 of the delay-off timer relay TR2 via conductor 196 and the closed contacts 218–2 of TR1. When timer TR2 is energized, normally closed contacts 206–2 of TR2 open and coil 210 of out gate air valve assembly 68 will be deenergized, thus opening the downstream gate, and allowing any loaves within the transfer means 20 to pass through on conveyor 22. When timer TR2 is energized, coil 208 of a conventional alarm or visual signal is energized to signal start of the rejection cycle.

When the in gate assembly 70 opens, any loaves stacked against the gate 98 will start to move into the interior of transfer means 20. The first loaf will be separated and rapidly transported into transfer means 20 as hereinbefore described because of the separation action caused by blocks 97 acting on the power-free rollers 24. When separation of the first stacked loaf occurs, the separation will be sensed by photocell relay 204 and coil 218 of TR1 will be deenergized. Simultaneously with the deenergization of coil 218 of TR1, contacts 218–1 of TR1 close and energize coil 204, thus actuating in gate assembly 70 and lowering the in gate 98 to the entrance of any additional loaves into transfer means 20.

When timer TR1 is deenergized, contacts 218–2 of TR1 open and the circuit to coil 206 of delay-off timer TR2 is broken. However, the delay-off time of TR2 is sufficient to allow any loaves within the transfer means 20 to pass out gate assembly 68, thus leaving the area within transfer means 20 free of loaves.

Note that when timer TR1 is deenergized and delay-off timer TR2 remains energized, coil 202 of relay CR1 is energized via conductor 196, the normally closed contacts 218–1 of TR1 and the closed contacts 206–1 of TR2, even though cam switch 262 (CS–1) has never been actuated to the closed position. The energization of relay CR1 energizes coil 216 of relay CR3, breaks the circuit to the stepper coil 220 and energizes coil 222 of the reset relay which resets stepper switch 226 as hereinbefore described. As long as relay CR3 is energized, and contacts 216–1 are closed, the air valve in gate coil 204 will remain energized and the in gate assembly 70 remains closed, allowing the exit of any loaves 36 within the transfer mechanism.

However, when the delay-off timer TR2 deenergizes, CR1 is deenergized, which in turn deenergizes CR3 breaking the circuit to coil 204 and opening in gate assembly 70, and closing out gate assembly 68. Since stepper relay 226 has been reset, any loaves 36 stacked against in gate 98 will be separated as hereinbefore described and counted as the loaves pass the photocell counting assembly 164 and 168, to start a new cycle.

While the hereinabove discussed control circuitry shown in FIGS. 8A and 8B is described in terms of counting five loaves into the transfer mechanism and transferring five loaves or ten loaves in a dual cycle, it may readily be seen that other packaged products may be transferred in other numbers, depending on their size, etc., and by utilizing the mechanism hereinabove described. Additional cam switches could be supplied to complete more than two transfers for transferring the packaged products for any preselected number of times to a loading tray before the loading tray is indexed out of position. Further it may be seen by those skilled in the art that a plurality of product transfer means 20 may be set up on the same conveyor or on adjacent conveyors for loading simultaneously into one loading tray or into two or more trays. Further, any combination of product transfer means 20 may be utilized for loading any predetermined number of packaged products without departing from the scope of the invention hereinabove described, and utilizing the basic transfer operation techniques and circuitry described in FIGS. 8A and 8B.

Figure 9:
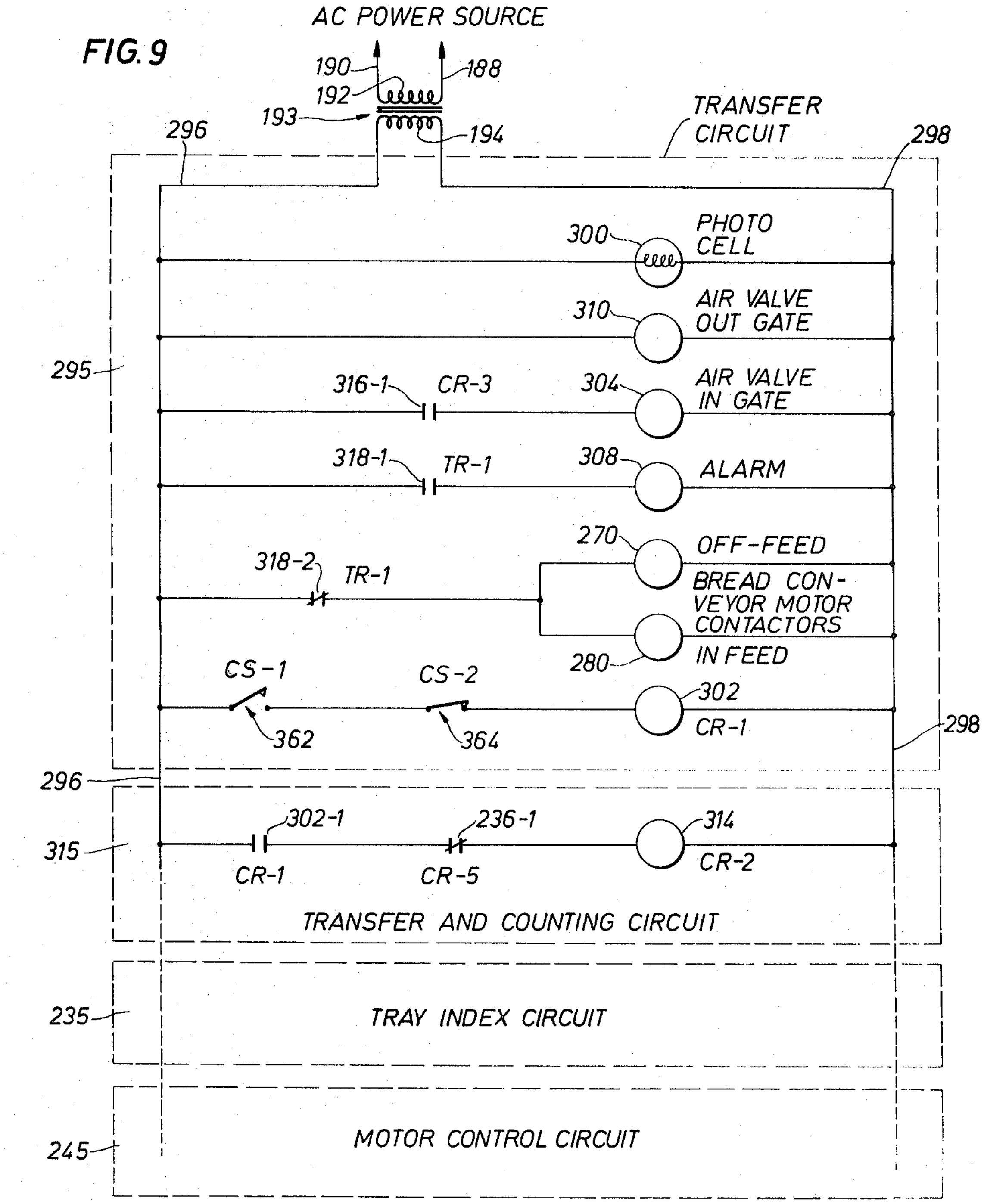
FIG. 9 is a detailed electrical schematic illustrating another embodiment of the tray loading apparatus utilizing a closed output gate and not having a rejection circuit.

A second embodiment of the product transfer means 20 and its control circuit may be seen in FIG. 9. In the system illustrated in FIG. 9, the AC power source via conductors 190 and 188 as shown in FIG. 8A would be used, as would the transfer, index and infeed motors 107, 144, and 176, respectively, in addition to the motor controller and circuit breaker circuit 174 and the start and stop switches 170 and 172 as hereinabove described in FIG. 8A. However, the transfer rejection circuit 195 and the transfer and counting circuit 215 would be modified to eliminate the rejection operation and are shown as circuits 295 and 315, respectively.

As shown in FIG. 9, AC power is applied to the power transformer 193 via conductors 190 and 188 to its primary winding 192, while AC power from the secondary winding 194 is applied via conductors 296 and 298 to the transfer and counting circuits 295 and 315, and the identical tray index and motor control circuits 235 and 245 as were hereinbefore described. In the second embodiment shown, the out gate assembly 68 would always remain closed since the coil 310 of the out gate air valve would be continuously energized via conductors 296 and 298. The operation of the product transfer means 20 utilizing the modified circuit shown in FIG. 9 would be identical to the transfer operation hereinabove described for FIGS. 8A and 8B, and as soon as the transfer operation had begun, cam switches 362 and 364 would be closed thereby energizing coil 302 of relay CR1. With relay CR1 energized, contacts 302–1 would be closed as would be contacts 236–1 of relay CR5 thereby energizing the coil 314 of relay CR2 of transfer and counting circuit 315. With relay CR2 energized, the transfer cycle would begin as hereinabove described for the operation of the motor control circuit 245.

Similarly, when relay CR3 (not shown) of the transfer and counting circuit 315 would be energized in the same sequence as hereinabove described for the transfer and counting circuit 215, the coil 304 of the in gate air valve would be energized via conductor 296 and the closed contact 316–1 of CR3, thereby closing gate 98 of the in gate assembly 70 during the transfer cycle.

In the event the predetermined delay-on time of timer relay TR1 is exceeded and TR1 is energized, an appropriate alarm 308 would be energized via the closed contacts 318–1 of TR1 and off-feed and infeed bread conveyor motor contactors 270 and 280, respectively, would lose their source of power via the now opened contacts 318–2 of TR1, thereby stopping the off-feed and infeed bread conveyors 21 and 22 (see FIG. 2) and sounding the alarm 308. The out gate assembly 68 would remain energized and closed since the coil 310 of the out gate air valve would continue to be energized. The control circuit of the second embodiment is simpler and provides no automatic recycling and rejection capabilities. As soon as the alarm is sounded and the off-feed and infeed bread conveyors 21 and 22 cease operation, the cause of the malfunction would have to be remedied and the system once again manually reset to continue operation of bread conveyors 21 and 22 for transferring the packaged products from conveyor 22 to the properly indexed loading trays.

Numerous variations and modifications may obviously be made in the structure herein described without departing from the scope of the present invention. Accordingly, it should be clearly understood that the forms of the invention herein described and shown in the figures on the accompanying drawings are illustrative only and are not intended to limit the invention.

What is claimed is:

1. Apparatus for continuous automatic transverse transfer of a predetermined number of packaged bakery products being transported by a continuously moving conveyor into a loading tray spaced adjacent the conveyor, comprising first gate means mounted above and spaced from the conveyor for engaging one of the packaged bakery products and arresting its movement on the conveyor, successive ones of the products being transported into engaging contact with said one stopped product for arresting movement of said successive ones of the packaged products, counting means spaced ahead of said first gate means for counting a predetermined number of the successive packaged products passing said counting means, second gate means mounted above and spaced from the conveyor and located ahead of said first gate means, said second gate means cooperating with said counting means for engaging another of said packaged bakery products and temporarily arresting its movement on the conveyor after said counting means has counted a predetermined number of packaged products entering the space between said first and second gate means, transfer means mounted between said first and second gate means above said conveyor and aligned with the adjacent loading tray, said transfer means transversely sweeping said predetermined number of arrested packaged products into the loading tray, and control circuit means cooperating with said first and second gate means, said counting means and said transfer means for operating said second gate means out of engagement with the other of the packaged bakery products after the predetermined number of products has been transferred by said transfer means and allowing additional successive packaged products to move into the space between said first and second gate means for counting by said counting means and automatically repeating the transfer cycle to another loading tray.

2. The apparatus as described in claim 1 wherein said first and second gate means comprise a first generally rectangular plate mounted above and spaced from the continuously moving conveyor, said plate being mounted transversely to the direction of movement of the conveyor, a second generally rectangular plate mounted above and spaced from the continuously moving conveyor, said plate being spaced from said first plate and mounted transversely to the direction of movement of the conveyor, a pair of spaced apart longitudinal guides vertically mounted on the side of each of said first and second plates facing the space between said plates, a pair of generally rectangular gates, each of which is adapted for vertical movement between one pair of said vertically mounted guides, and means mounted on each of said first and second plates for raising and lowering said gates for each of said first and second gate means independently to a position closely spaced from the conveyor for engaging said one or another of the packaged bakery products.

3. The apparatus as described in claim 2, wherein said means for raising and lowering said gates comprises a pair of pneumatic cylinders one of which is vertically mounted on each of said first and second plates above respective ones of said gates and connected thereto by the extendable shaft of said cylinder, and a pair of air valves, one adapted for use within each of said pair of pneumatic cylinders, said air valves controlling the operation of said pneumatic cylinders in response to electrical signals from said control circuit means.

4. The apparatus as described in claim 1 wherein said counting means comprises a photocell light source mounted on the upstream side of said second gate means and oriented to direct a beam of light downwardly toward the continuously moving conveyor in the path of the moving packaged bakery products, a photocell pickup mounted on the upstream side of said second gate means and oriented for receiving successive reflected light beams from said photocell light source as said light beam is reflected from the packaging material of successive ones of the moving products passing through said second gate means, a stepping switch operable to close successive sets of contacts upon energization of the stepping switch coil, said switch adapted to transmit a signal to said control circuit means upon the closing of a predetermined number of said sets of contacts equal to the predetermined number of packaged products to be counted, and a relay switch operable by said photocell pickup to apply successive electrical voltages to said stepper switch coil for energizing said coil upon receipt of said successive reflected light beams.

5. The apparatus as described in claim 1 wherein said transfer means comprises a drive shaft horizontally mounted for rotation between said first and second gate means, said drive shaft having at least first, second and third spaced sprockets fixed thereon, an idler shaft horizontally mounted for rotation between said first and second gate means and spaced laterally from said drive shaft nearer the loading tray, said idler shaft having at least first and second spaced apart sprockets fixed thereon in horizontal alignment with said second and third sprockets of said drive shaft, a pair of linked chains one of which forms a first closed transverse chain loop engaging said first sprocket of said idler shaft and said second sprocket of said drive shaft, the other chain forming a second closed transverse chain loop parallel to said first chain loop, said second chain loop engaging said second sprocket of said idler shaft and said third sprocket of said drive shaft, a pair of rectangular paddles attached transversely across said parallel chain loops and spaced equally one from the other, each of said paddles being attached to each of said linked chains and adapted for maintaining a perpendicular attitude with respect to said chains, transfer drive motor means responsive to said control circuit means, and a drive chain engaging said first sprocket of said drive shaft and driven by said transfer motor means for rotating said drive shaft and sweeping at least one of said paddles transversely across the conveyor between said first and second gate means for engaging the packaged products arrested thereon and pushing said predetermined number of products into the adjacent loading tray.

6. The apparatus as described in claim 5, and further including a fourth sprocket fixed to said drive shaft, a plurality of cam switches mounted for rotation on a cam shaft, said switches closing in a predetermined sequence to signal said control circuit means when said transfer means initiates and ends its motion, said cam shaft having a sprocket fixed thereon, and a drive chain engaging said fourth sprocket of said drive shaft and said cam shaft sprocket for driving said cam shaft synchronously with said drive shaft.

7. The apparatus as described in claim 1, wherein said control circuit means further causes said first and second gate means to disengage said one and another of the packaged bakery products if the loading tray is not properly spaced and located adjacent the moving conveyor, thus allowing the products to resume movement with the conveyor and pass through said first and second gate means.

8. The apparatus as described in claim 1, wherein said control circuit means further causes said first and second gate means to disengage said one and another of the products if said transfer means fails to transfer the predetermined number of packaged bakery products into the loading tray within a predetermined time period, thus allowing the products to resume movement with the conveyor and pass through said first and second gate means.

9. The apparatus as described in claim 5, wherein said transfer drive motor means includes an electrical drive motor, an electrical clutch-brake operably connected to the drive shaft, said drive motor, said clutch-brake having clutch and brake coils separately energizable by said control circuit means for controlling the drive motor output, and a gear box driven by said drive motor through said clutch-brake and having an output shaft and drive sprocket for engaging and driving said drive chain.

10. Apparatus for automatically transferring a predetermined number of packaged bakery products being transported by a continuously moving conveyor into a loading tray spaced adjacent the conveyor, comprising first gate means mounted above the conveyor for engaging and arresting the movement of one of the packaged products on the conveyor, successive ones of the products being transported into contact with said one arrested packaged product for arresting the movement of said successive ones of the bakery products, second gate means mounted above the conveyor and located ahead of said first gate means for defining a spaced therebetween, said second gate means being operable for engaging and arresting the movement of another one of said packaged products, an infeed conveyor for transporting a plurality of spaced loading trays, an index conveyor for receiving successive ones of said spaced loading trays from said infeed conveyor and indexing a first tray into position closely spaced and parallel to the packaged bakery products conveyor and directly adjacent said space between said first and second gate means, stopping means cooperating with said infeed and index conveyors for engaging and maintaining said first tray in said proper indexed position, said stopping means further including a first switch engageable by said first tray in said proper indexed position for stopping operation of said index conveyor, and a second switch engageable by a second tray following said first tray at a spaced interval for stopping operation of said infeed conveyor, counting means adjacent said second gate means for counting the successive bakery products passing through said second gate means into said space between said first and second gate means.

control circuit means cooperating with said counting and stopping means for operating said second gate means into arresting engagement with said another one of the bakery products after said first and second loading trays have engaged said first and second switches and said counting means has counted a predetermined number of packaged products, transfer means mounted above the conveyor and in said space between said first and second gate means, said transfer means operable in response to said control circuit transversely sweeping said predetermined number of packaged products into said first loading tray, and cam switch means cooperating with said transfer means for signalling said control circuit means when said transfer means initiates and ends its transfer motion, said control circuit means thereafter operating said second gate means out of arresting engagement with said another one of the packaged products for allowing the continued movement of successive products toward said first gate means, said control circuit means further cooperatively opearting said stopping means and said infeed and index conveyors to move said loaded first tray out of said indexed position and moving said second tray into said proper indexed position engaging said stopping means and said first switch, while moving a third tray into position engaging said second switch for repeating the transfer cycle.

11. The apparatus as described in claim 10 wherein said first and second gate means comprise a first generally rectangular plate mounted above and spaced from the continuously moving conveyor, said plate being mounted transversely to the direction of movement of the conveyor, a second generally rectangular plate mounted above and spaced from the continuously moving conveyor, said plate being spaced from said first plate and mounted transversely to the direction of movement of the conveyor, a pair of spaced apart longitudinal guides vertically mounted on the side of each of said first and second plates facing the space between said plates, a pair of generally rectangular gates, each of which is adapted for vertical movement between one pair of said vertically oriented guides, and means mounted on each of said first and second plates for raising and lowering said gates for each of said first and second gate means independently to a position closely spaced from the conveyor for engaging said one or another of the packaged bakery products.

12. The apparatus as described in claim 11, wherein said means for raising and lowering said gates comprises a pair of pneumatic cylinders one of which is vertically mounted on each of said first and second plates above respective ones of said gates and connected thereto by the movable shaft of said cylinder, and a pair of air valves one adapted for use with each of said pneumatic cylinders, said air valve controlling the operation of said pneumatic cylinders in response to electrical signals from said control circuit means.

13. The apparatus as described in claim 10, wherein said index and infeed conveyors comprise an elongated frame structure, a pair of spaced conveyor belts adapted for lateral longitudinal movement with respect to said frame structure, said belts frictionally engaging the lower surface of opposite end flanges of the loading trays, and driving means for imparting lateral movement to said spaced conveyor belts.

14. The apparatus as described in claim 13, wherein said infeed and index conveyors each include driving means comprising an electric drive motor, an electric clutch-brake operably driven by said drive motor, said clutch-brake having a clutch and brake coil separately energizable by said control circuit means for controlling the drive motor output, and a gear box driven by said drive motor through said clutch-brake and operably connected to the drive shaft of said respective infeed and index conveyors.

15. The apparatus as described in claim 13, wherein said stopping means includes an axle mounted on said index conveyor frame below the level of the conveyor belts and positioned transversely to the direction of movement of said belts, a pair of elongated tray stops mounted for rotation on said axle near one end of said tray stops in a spaced apart relationship and positioned between said conveyor belts, said tray stops when rotated to a vertical position extending above the level of said conveyor belts for engaging a loading tray and stopping its lateral motion, an operating rod laterally and rigidly interconnecting said spaced tray stops, extending means operably connected to said operating rod for raising and lowering said operating rod and pivoting the rigidly connected tray stops about said axle to a vertical position for engaging and stopping the loading tray or pivoting said tray stops to a horizontal position below the level of the conveyor belts for allowing a loading tray to pass over the tray stops.

16. The apparatus described in claim 15, wherein said extending means comprises a pneumatic cylinder pivotally mounted to said index conveyor frame, the extendable shaft of which is pivotally coupled to said operating rod for raising and lowering said operating rod and said rigidly connected tray stops, an air valve adapted for use with said pneumatic cylinder, said air valve controlling the operation of said pneumatic cylinder in response to electrical signals from said control circuit means.

17. The apparatus as described in claim 14, wherein said first switch of said stopping means when engaged by said first tray in said proper indexed position signals said control circuit means to energize said brake coil of said clutch-brake of said index conveyor driving means.

18. Apparatus as described in claim 14, wherein said second switch of said stopping means when engaged by a second tray following said first tray at a spaced interval signals said control circuit means for energizing the brake coil of said clutch-brake of said infeed conveyor driving means.

19. The apparatus as described in claim 10, wherein said counting means comprises a photocell light source mounted on the upstream side of said second gate means and oriented to direct a beam of light downwardly toward the continuously moving conveyor in the path of the moving packaged bakery products, a photocell pickup mounted on the upstream side of said second gate means and oriented for receiving successive reflected light beams from said photocell light source as said light beam is reflected from the packaging material of successive ones of the moving products passing through said second gate means, a stepping switch operable to close successive sets of contacts upon energization of a stepping switch coil, said switch adapted to transmit a signal to said control circuit upon the closing of a predetermined number of said sets of contacts equal to the predetermined number of packaged products to be counted, and a relay switch operable by said photocell pickup to apply successive electrical voltages to said stepper switch coil for energizing said coil upon receipt of said successive reflected light beams.

20. The apparatus as described in claim 11, wherein said transfer means comprises a drive shaft horizontally mounted for rotation between said first and second rectangular plates, said drive shaft having at least first, second and third spaced sprockets fixed thereon, an idler shaft horizontally mounted for rotation between said first and second rectangular plates and spaced laterally from said drive shaft nearer the loading tray, said idler shaft having at least first and second spaced sprockets fixed thereon in horizontal alignment with said second and third sprockets of said drive shaft, a pair of linked chains one of which engaged said first sprocket of said idler shaft and said second sprocket of said drive shaft, the other chain spaced from and parallel to said first chain and engaging said second sprocket of said idler shaft and said third sprocket of said drive shaft, a pair of rectangular paddles atached transeversely across said parallel chains and spaced equally one from the other, each of said paddles being attached to each said linked chains and adapted for maintaining a perpendicular attitude with respect to said chains.

transfer drive means responsive to said control circuit means, and a drive chain engaging said first sprocket of said drive shaft operated by said transfer drive means for rotating said drive shaft and sweeping at least one of said paddles transversely across the conveyor between said first and second rectangular gates for engaging the packaged products arrested thereon and pushing said predetermined number of products into the indexed first loading tray.

21. The apparatus as described in claim 20, wherein said cam switch means cooperating with said transfer means comprises a fourth sprocket fixed to said transfer drive shaft, a plurality of cam switches mounted for rotation on a cam shaft, said switches closing in a predetermined sequence to signal said control circuit means when said transfer means initiates and ends its motion, said cam shaft having a sprocket fixed thereon, and a drive chain engaging said fourth sprocket of said drive shaft and said cam shaft sprocket for driving said cam shaft synchronously with said transfer drive shaft.

22. The apparatus as described in claim 10, wherein said control circuit means further causes said first and second gate means to disengage said one and another of the packaged bakery products if said first loading tray is not properly indexed in said index conveyor, thus allowing the products to resume movement with the continuously moving conveyor and pass through said first and second gate means.

23. The apparatus as described in claim 10, wherein said control circuit means further causes said first and second gate means to disengage said one and another of the products if said transfer means fails to transfer the predetermined number of packaged bakery products into said first loading tray within a predetermined time period, thus allowing the products to resume movement with the continuously running conveyor and pass through said first and second gate means.

References Cited

UNITED STATES PATENTS

| | | | |
|---|---|---|---|
| 3,027,697 | 4/1962 | Croasdale | 53—62 |
| 3,466,839 | 9/1969 | Temple | 53—55 |

TRAVIS S. McGEHEE, Primary Examiner

U.S. Cl. X.R.

53—62, 159, 251